United States Patent

[11] 3,588,844

[72] Inventor Alton O. Christensen
Houston, Tex.
[21] Appl. No. 839,720
[22] Filed July 7, 1969
[45] Patented June 28, 1971
[73] Assignee Shell Oil Company
New York, N.Y.
Continuation-in-part of application Ser. No. 827,193, May 23, 1969.

[54] SENSE AMPLIFIER FOR SINGLE DEVICE PER BIT MOSFET MEMORIES
24 Claims, 4 Drawing Figs.

[52] U.S. Cl. .......... 340/173, 307/238, 307/279
[51] Int. Cl. .......... G11c 11/40, H03k 3/286
[50] Field of Search .......... 340/173; 307/238, 279

[56] References Cited
UNITED STATES PATENTS
3,292,008 12/1966 Rapp .......... 340/173
3,363,115 1/1968 Stephenson .......... 340/173

*Primary Examiner*—Terrell W. Fears
*Attorneys*—T. E. Bieber and J. H. McCarthy

ABSTRACT: A highly efficient sense amplifier for metal oxide silicon chip memory arrays can be built by using a pair of cross-coupled sensing MOSFETs connected in a racing mode between a bit line capacitance and a precharge storage capacitance to produce a full-"1" or full-"O" bit line condition responsive to the capacitive information charge stored in an addressed bit, and transferred to the bit line which condition can serve both as a restoring signal and as a readout signal. Bit line capacitance can be reduced, and a separate precharge storage capacitance eliminated, by connecting each of the cross-coupled MOSFETs to half of the bit line, and using the line capacitance of the idle half of the bit line as the precharge storage capacitance.

INVENTOR.
ALTON O. CHRISTENSEN
Mellin, Moore & Weissenberger
ATTORNEYS

INVENTOR.
ALTON O. CHRISTENSEN
BY
Mellin, Moore & Weissenberger
ATTORNEYS

SENSE AMPLIFIER FOR SINGLE DEVICE PER BIT MOSFET MEMORIES

This application is a continuation-in-part of pending application Ser. No. 827,193, filed May 23, 1969.

BACKGROUND OF THE INVENTION

This invention relates to the single device per bit metal oxide silicon chip memory disclosed in the copending application Ser. No. 825,257, filed May 16, 1969, entitled SINGLE RAIL MOSFET MEMORY WITH CAPACITIVE STORAGE. In that application, a single device per bit metal oxide silicon field effect transistor (MOSFET) memory is disclosed in which informational charge increments are transferred between the cell capacitance of an addressed memory cell and a bit line capacitance, and reading, writing, and restoring is done by conventional external means. It is of course highly desirable to incorporate the reading, writing, and restoring circuitry on the memory chip itself, and it is further desirable to make the read amplifier as insensitive as possible to variations in the absolute bit line voltage or in the informational charge increments impressed on the bit line, or to parameter variations between individual MOSFETs on the chip.

SUMMARY OF THE INVENTION

The present invention provides a solution to the aforesaid problem by providing a MOSFET read-write-restore circuit capable of being formed on the memory chip itself and using a pair of cross-coupled MOSFETs connected in a racing mode between a precharge capacitance and the bit line capacitance to transform a small bit line voltage variation resulting from a charge transfer into a full-"1" or full-"0" data output and restoration signal, regardless of the absolute values of the voltages involved.

The circuit of this invention has the further advantage over the circuit of the prior application that the write time of the cycle precedes the read time, and that it is consequently possible to perform a writing and reading operation on a given cell in the same cycle.

Furthermore, in accordance with a further aspect of this invention, the bit line capacitance (which should be as small as practically possible) can be cut in half by splitting the bit line in two and selectively addressing one or the other half of the bit line. This system has the further advantage of dispensing with the necessity for a separate precharge capacitance, as the bit line capacitance of the idle bit line half can be used as the precharge capacitance.

Finally, the invention makes it practical to use a separate read-write-restore circuit for each column of the memory array, so that the entire memory can be exercised by exercising each row once in sequence. In a typical 1024-bit MOSFET memory, in which each bit needs to be exercised at least once every millisecond, the 32-volt refresh sequence (which represents wasted working time) is a considerable improvement over the 256-cycle refresh sequence of the copending application.

It is therefore the object of the invention to provide a read-write-restore circuit suitable for incorporation in a single-device-per-bit MOSFET memory chip.

It is a further object of the invention to provide a circuit of the type described which translates even the minutest voltage increment in the bit line as a result of information transfer into a full-"1" or "0" output.

It is yet another object of the invention to provide a circuit of the type described which automatically restores during each cycle all bits which have the same X address as the addressed bit.

It is still another object of the invention to provide a circuit of the type described in which writing and reading can be accomplished on an addressed bit in the same cycle.

DESCRIPTION OF THE PREFERRED EMBODIMENT

A standard 1024-bit random access memory is typically arranged in a square array of 32 columns by 32 rows. Each column is identified by a specific X address, and each row is identified by a specific Y address.

Figure 1:
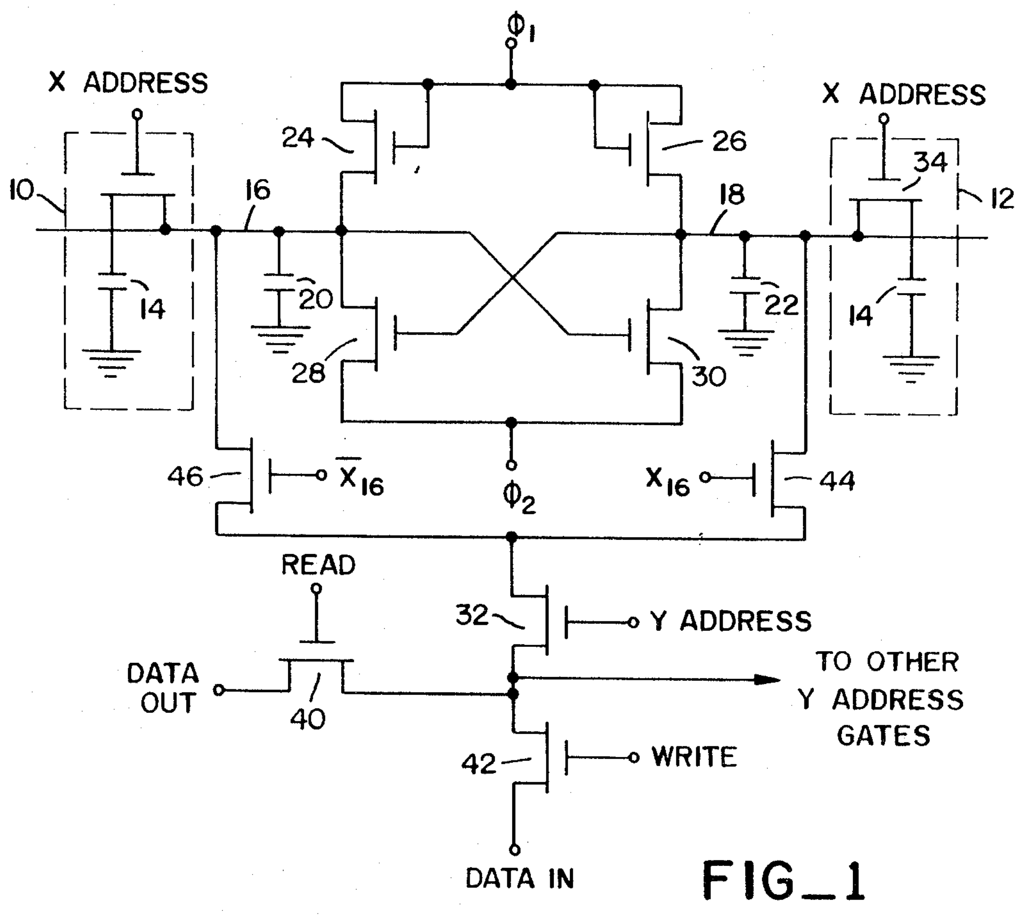
FIG. 1 is a fragmentary circuit diagram showing the device of this invention and its relation to a single-bit-per-device MOSFET memory.

In FIG. 1 the reference numeral 10 designates one of sixteen memory cells which make up the left half of a given row of such an array. Each cell represents one bit of information. These memory cells, of which only one is shown for clarity, all have a common Y address but different X addresses, and the information therein, represented by the charge on internal capacitance 14, is transferred to the common bit line half 16 when the cell is addressed by a coincidence of the proper X and Y addresses.

The reference numeral 12 designates one of the other sixteen cells with the same Y address as the previously mentioned cells. The information stored in the internal capacitance 14 of an addressed one of the cells represented by cell 12 is transferred to the common bit line half 18. It will be seen that this arrangement divides the bit line for a given Y address into two halves 16, 18 for a purpose hereinafter described, and that the bit line capacitance is thus also divided into two halves 20, 22.

Figure 2:
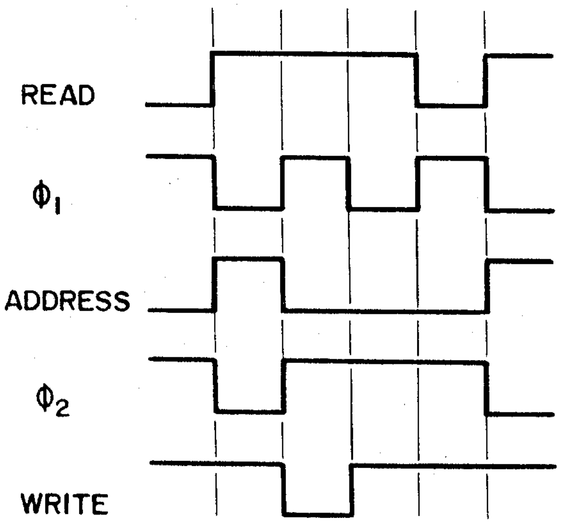
FIG. 2 is the timing diagram for the circuit of FIG. 1.

The nature and operation of the device of this invention is best understood by following an operational cycle of the timing diagram shown in FIG. 2. At the beginning of the cycle, one of the bit line capacitance 20, 22 is at ground, and the other at logic "1" from the previous cycle. Consequently, one of the MOSFETs 28, 30 is enabled, and the other is blocked. Let us assume that 20 is at ground and that 22 is at logic "1."

The initiation of the clock pulse $\Phi_1$ now enables MOSFETs 24 and 26, and the simultaneous initiation of $\Phi_2$ applies logic "1" to the common connection of MOSFETs 28 and 30. The application of logic "1" to bit line half 16 simultaneously through both of the enabled MOSFETs 24, 28 rapidly charges capacitance 20 to a full "1" level of, for example, about 8 volts. The impression of a "1" on bit line half 16 enables MOSFET 30, and the circuit is now ready to receive information.

Following the cessation of the $\Phi_1$ and $\Phi_2$ pulses, the circuit is addressed with the gates of both MOSFETs 28 and 30 at logic "1." For the purposes of this description, let it be assumed that the address selected is the address of cell 12. The address pulse (FIG. 2) enables MOSFETs 32 and 34, the former being responsive to the Y portion, and the latter to the X portion of the address of cell 12. The enabling of MOSFET 34 causes capacitor 14 to be connected to bit line half 18. Assuming that the information stored in cell 12 is a "0" (i.e. no charge on capacitance 14 of cell 12), capacitance 14 is charged by the much larger bit line capacitance 22. As a result, the line voltage in bit line half 18, and hence the potential applied to the gate of MOSFET 28, will decrease slightly. It will be seen that the advantage of splitting the bit line into two halves 16, 18 is the reduction of the bit line capacitance from which the capacitance 14 draws its charge, and a consequent increase in the potential difference applied to the gate of MOSFET 28.

Had the information in cell 12 been a "1," no charge transfer would have taken place between line capacitance 22 and cell capacitance 14 of cell 12. However, the total capacitance charged to the "1" level in bit line half 18 (cell capacitance 14 plus line capacitance 22 plus the gate capacitance of MOSFET 28) is greater than the "1"-charged capacitance in bit line half 16 (line capacitance 20 plus gate capacitance of MOSFET 28).

Immediately upon the cessation of the $\Phi_1$ and $\Phi_2$ pulses, MOSFETs 24 and 26 cease conducting, and bit line halves 16, 18 are connected to ground through MOSFETs 28 and 30, respectively. MOSFETs 28 and 30 are now connected in a "race" mode, i.e. they both discharge their gate capacitance to ground level until one of them reaches the threshold voltage. The first MOSFET to reach threshold voltage ceases to conduct and prevents further discharge of the gate of the opposing MOSFET. Consequently, the opposing MOSFET continues to conduct until the gate capacitance of the first MOSFET is completely discharged to ground.

Thus, if the line voltage on bit line half 18 is lower than that on bit line half 16 (a "0" readout from cell 12), the gate of MOSFET 28 starts closer to threshold and reaches threshold first. On the other hand, if the line voltages are equal (a "1" readout from cell 12), the slower discharge rate of bit line half 18, due to the total capacitance on that side being larger than that on the side of bit line half 16, causes the gate of MOSFET 30 to reach the threshold voltage first. Consequently, if cell 12 holds a "1" when addressed, bit line half 18 remains at a threshold voltage level, whereas bit line half 16 continues to discharge and eventually reaches ground level.

When the second $\Phi_1$ pulse now occurs, MOSFET 30 is blocked, and line capacitance 22 is recharged to a full "1" level through MOSFET 26. The potential in bit line half 16 also rises, the absence of a $\Phi_2$ pulse at this time causes a voltage divider action through MOSFETs 24 and 28.

MOSFETs 24, 28 (and 26, 30) may be so proportioned with respect to one another that the potential of bit line half 16 is kept below threshold regardless of the duration of the $\Phi_1$; or else they may all be equal, and the duration of the $\Phi_1$ pulse may be kept short enough to prevent the potential of bit line half 16 from reaching threshold.

Following the end of the second $\Phi_1$ pulse, MOSFETs 24, 26 are blocked, and bit line half 16 discharges back to ground level through MOSFET 28. Bit line half 18 remains at logic "1" because MOSFET 30 is blocked.

Writing is accomplished by enabling the write gate 42 during the write pulse in the presence of input data. The low-impedance input data easily overrides the effect of cell capacitance 14 on the line voltage, and the input data is thus substituted for the date stored in cell 12. It should be noted that the write pulse occurs before the read pulse, and it is therefore possible to write, and to read the just written data, in the same operational cycle.

Inasmuch as the cell capacitance 14 of cell 12 remains connected to bit line half 18 throughout the address pulse, it follows the line voltage changes in bit line half 18. At the end of the address pulse, the cell capacitance 14 is therefore in a restored (or newly written) full "1" or full "0" condition.

It will be noted that if the X portion of the address of cell 12 is present during the address pulse, cell 12 will go through a destroy-and-restore cycle of information transfer even though the absence of the Y portion of the address prevents reading or writing. Consequently, all cells with a given X address are exercised each time any one of them is exercised.

Inasmuch as the charges on the cell capacitances 14 tend to gradually leak off, it is necessary to periodically (about once every millisecond) refresh the information stored in the bits of nonaddressed columns. This can be accomplished by providing a cycle counter (not shown) driven by, e.g., the $\Phi_2$ pulses, which periodically interrupts the random operation of the array and exercises all X addresses in sequence without reading or writing. For a 1024-bit array in a 32×32-bit configuration with a 100 nanosecond cycle, the 32-cycle refresh sequence (which is wasted time as far as the computer is concerned) would consume 3200 nanoseconds per millisecond, or an insignificant 0.32 percent of the total operating time.

Depending on the X address of an addressed memory cell, it may lie on bit line half 16 or on bit line half 18. The X address is conventionally arrived at by feeding binary address component signals $X_1$, $X_2$, $X_4$, $X_8$, and $X_{16}$ to a series of decoders (not shown), one for each X address. Each decoder is arranged to produce an output only in the presence of a specific combination of address component signals. Conventionally, the X addresses in the right half of a 32-column array each have an $X_{16}$ component, while those in the left half do not. Consequently, the proper selection of bit line half 16 or 18 for a given X address is readily made by applying $X_{16}$ to selection gate 44, and $\overline{X}_{16}$ to the selection gate 46.

It is, of course, possible to connect the entire bit line to one side of the sense amplifier, e.g. to the junction between MOSFETs 26, 30. This would dispense with the necessity for the selection gates 44, 46. On the other hand, it would necessitate the provision of a capacitive pad connected to the junction between MOSFETs 24, 28, of a capacitance equal to the line capacitance of the bit line, to replace the line capacitance of the idle bit line half in the preferred embodiment. Also, as pointed out hereinabove, the decrease in the active bit line capacitance resulting from the splitting of the bit line makes the circuit parameters less critical.

Figure 3:
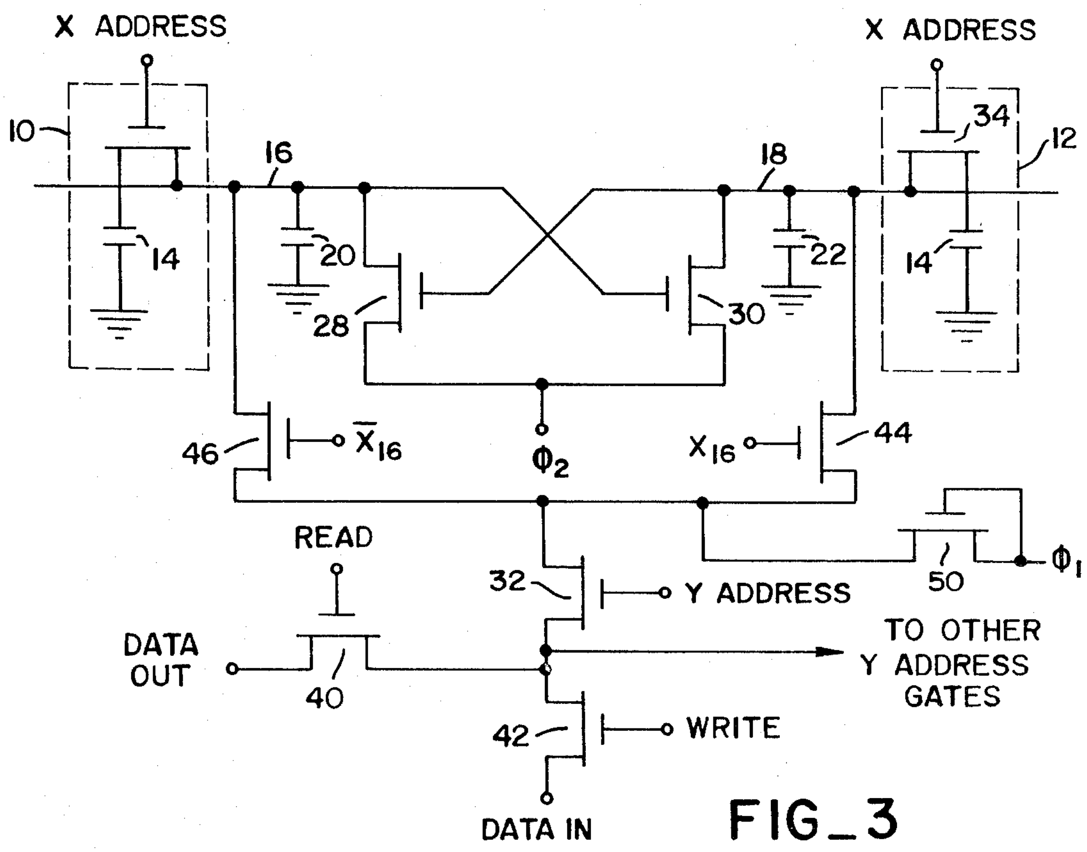
FIG. 3 is a fragmentary circuit diagram showing a further embodiment of the device of this invention.

FIG. 3 shows a modification of the circuit described above in which a single MOSFET 50 is substituted for the pair of MOSFETs 24 and 26 of FIG. 1. Since a pair of MOSFETs 24 and 26 is required for each of the 32 rows of a memory constructed as shown in FIG. 1, and only one MOSFET 50 is required for each of the 32 rows of a memory constructed as shown in FIG. 3, a potential saving of some 32 MOSFETs per memory is offered by using the construction shown in FIG. 3. However, as will be seen when the operation of the device shown in FIG. 3 is more fully discussed, one or more additional MOSFETs will be required for each complete memory constructed as shown in FIG. 3 than are required for a complete memory constructed as shown in FIG. 1. Thus the potential saving will be reduced by one or two MOSFETs. A saving in number of MOSFETs per memory will obviously enable the memory to be more easily placed on a chip of given size. It will also reduce the fabrication cost, not so much by eliminating the cost of formation of such MOSFETs, as by improving the yield which will vary inversely with the total number of MOSFETs per chip required for a particular memory.

As will be seen from the following description of the operation of the device shown in FIG. 3, this modification will also simplify the operation of the memory by requiring only a single $\Phi_1$ clock pulse during each cycle of operation rather than the double $\Phi_1$ pulse required in the operation of the device shown in FIG. 1. In addition the $\Phi_1$ clock pulse is available during the readout portion of the cycle to charge the inherent capacitance of the output line thus providing more reliable operation and readings even where such output line is of unusual length.

Figure 4:
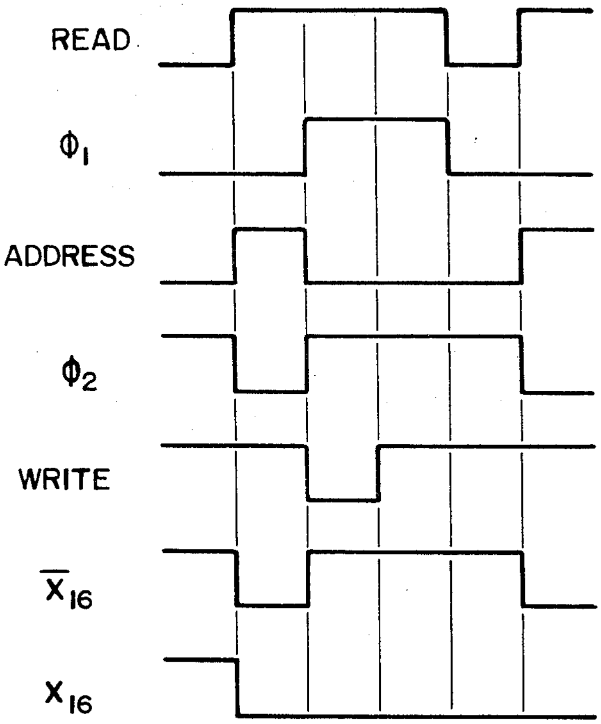
FIG. 4 is the timing diagram for the circuit of FIG. 3.

Referring now to FIG. 4 it will be seen that the read, address, $\Phi_2$, and write pulses of the cycle of operation of the device shown in FIG. 3 are the same as those shown in FIG. 2 for the device of FIG. 1. However, since the MOSFET 50 of the device shown in FIG. 3 is connected to MOSFETs 28 and 30 through MOSFETs 46 and 44, respectively, it is necessary to apply a pulse to the gates of both 46 and 44 during the portion of the $\Phi_1$ pulse which occurs during the first, or precharge, time interval of the cycle of operation. Such pulses may be readily derived from a single FARMOST inverter circuit such as that described in patent No. 3,502,908 which issued from application Ser. No. 787,067, filed Dec. 26, 1968 requiring one or two MOSFETs for the complete memory. Such inverter circuits could be precharged by the $\Phi_2$ pulse, for example, which is coincident with that portion of the $\Phi_1$ pulse which occurs during the first time interval of the cycle of operation. FIG. 4 shows the $X_{16}$ and $\overline{X}_{16}$ pulses required to be applied to the gates of 44 and 46, respectively, of the device shown in FIG. 3 if cell 12 is addressed as in the example described hereinabove with respect to FIG. 1. The continuation of the $X_{16}$ pulse on the gate of 44 may, of course, be derived from the X address after the end of the $\Phi_2$ pulse and that portion of the $\Phi_1$ pulse which occurs during the first time interval of the cycle.

Thus, at the beginning of the cycle let us assume that bit line capacitance 20 is at ground and 22 is at logic "1." MOSFET 50 is enabled by the $\Phi_1$ clock and the $\Phi_2$ clock pulse can be used to enable MOSFETs 44 and 46 through appropriate precharged inverter circuits as suggested above.

The application of both $\Phi_1$ and $\Phi_2$ pulses to capacitance 20 of bit line half 16 through MOSFETs 46 and 28 respectively rapidly charges it to full logic "1" level which enables MOSFET 30 making the circuit ready to receive information.

Following the cessation of the $\Phi_1$ and $\Phi_2$ pulses, MOSFETs 46 and 50 cease conducting and cell 12, for example, of the circuit is addressed by enabling MOSFETs 32, 34 and 44. The operation of the circuit of FIG. 3 through the "write" and "race" portions of the cycle proceeds as described with respect to the circuit shown in FIG. 2. However, during the "read" portion of the cycle the $\Phi_1$ clock pulse resumes, enabling MOSFET 50. It will be seen that the $\Phi_1$ clock pulse will be connected to the output line through MOSFETs 32 and 40 and is thus available to help capacitances 22 and 14 charge the output line in the event that logic "1" is stored in cell 12. The availability of the $\Phi_1$ pulse will also avoid degradation of the logic "1" charge stored in cell 12. If logic "0" is stored in cell 12, it will have lost the "race" with the opposing side of the bit line and MOSFET 30 will be enabled, thus connecting $\Phi_1$ to ground through MOSFET 30 and the $\Phi_2$ input which is at ground during the "read" portion of the cycle, thus giving a logic "0" output.

As pointed out above, the double $\Phi_1$ pulse required by the circuit shown in FIG. 1 is not required by the circuit shown in FIG. 3. This also means that the voltage divider action described with respect to MOSFETs 24 and 28 (or 26 and 30) of FIG. 1 during the second $\Phi_1$ pulse is unnecessary, thus causing the fabrication of the circuit shown in FIG. 3 to be somewhat simpler and less expensive than the fabrication of the circuit shown in FIG. 1. The periodic refresh sequence in which all X addresses are exercised in sequence to restore their charge is, of course, possible in the circuit of FIG. 3 as in the circuit of FIG. 1. The periodic refresh sequence in which all X addresses are exercised in sequence to restore their charge is, of course, possible in the circuit of FIG. 3 as in the circuit of FIG. 1. Similarly the various modifications suggested with respect to the circuit of FIG. 1 are also possible with respect to the circuit of FIG. 3.

I claim:

1. A MOSFET sense amplifier for sensing information-representing charge transfers to and from a memory capacitance, comprising:
   a. a pair of cross-coupled MOSFETs having a common source connection and having their gates connected to each other's drain;
   b. a pair of capacitive means each connected to the drain of one of said MOSFETs;
   c. precharge means arranged to precharge said capacitive means during a first period of time to a substantially equal energy level sufficient to enable both of said MOSFETs;
   d. address means for rendering said energy levels of said capacitive means unequal following said precharge by connecting said memory capacitance to one of said capacitive means; and
   e. means arranged to drive said capacitive means toward ground through the source-drain circuit of said MOSFETs during a subsequent second time period, whereby said MOSFETs are caused to operate in a race mode which results in the capacitive means with the greater energy level being brought to threshold voltage, and the capacitive means with the lesser energy level being brought to ground.

2. A device according to claim 1, further including means for driving said capacitive means with the greater energy level to a predetermined potential greater than said threshold voltage while generally maintaining said capacitive means with the lesser energy level at ground, during a subsequent third time period.

3. A device according to claim 1, further including write means operable following said precharge to override the effect of said address means by connecting said one of said capacitive means to a low-impedance data source.

4. A memory device of the capacitive storage type, comprising:
   a. an array of capacitive-storage memory cells arranged in rows having a common Y address, and columns having a common X address;
   b. a plurality of bit line means, one for each row;
   c. X address means operative during clocked address pulses for connecting each of said memory cells in a selected column to the bit line means of its row; and
   d. a plurality of sense amplifier means, one for each row, each including:
      i. A pair of cross-connected MOSFETs having their drains connected to each other's gate and to capacitive means; and
      ii. a pair of charging gate means connected between a source of first clock pulses and the respective drains of said cross-connected MOSFETs, and gated by said first clock pulses;
      iii. the sources of said cross-connected MOSFETs being connected to a source of second clock pulses;
   e. said bit line means being connected to the drain of one of said cross-connected MOSFETs of the sense amplifier in the same row.

5. The device of claim 4, in which said capacitive means connected to the MOSFET drain to which said bit line means is connected is the bit line capacitance.

6. The device of claim 4, in which said first clock pulses have twice the repetition rate of said second clock pulses and said address pulses, and said address pulses being immediately following alternate ones of said first clock pulses, straddle the other ones of said first clock pulses, but do not occur during said second clock pulses.

7. The device of claim 4, further comprising data input and data output means common to the entire array; and a plurality of Y address gate means, one for each row, said Y address gate means being selectively enabled during said address pulses and being connected between said data input and output means and said bit line means.

8. The device of claim 7, further comprising read gate means gated by clocked read pulses and connected between said data output means and said Y address gate means; and write gate means gated by clocked write pulses and connected between said data input means and said Y address gate means.

9. The device of claim 8, in which said read pulses occur substantially during the portion of said address pulses following the end of said alternate ones of said first clock pulses.

10. The device of claim 8, in which said write pulses occur substantially during the portion of said address pulses preceding the beginning of said alternate ones of said first clock pulses.

11. The device of claim 4, in which each said bit line means is divided into two separate halves, one half being connected to the drain of one of the cross-connected MOSFETs of its amplifier, and the other half being connected to the drain of the other cross-connected MOSFET of the same amplifier.

12. The device of claim 11, in which said capacitive means are the respective line capacitances of the two halves of the bit line means.

13. The device of claim 11, further comprising data input and output means, and bit line half selection gate means interposed between each of said bit line halves and said data input and output means, and gated, respectively, by third and fourth pulses selectively occurring coincidentally with said address pulses.

14. The device of claim 13, in which said third and fourth pulses are mutually exclusive and are component parts of all the X addresses of the cells associated with the selected bit line half.

15. A memory device of the capacitive storage type, comprising:

a. an array of capacitive-storage memory cells arranged in rows having a common Y address, and columns having a common X address;
b. a plurality of bit line means, one for each row;
c. X address means operative during clocked address pulses for connecting each of said memory cells in a selected column to the bit line means of its row; and
d. a plurality of sense amplifier means, one for each row, each including:
   i. a pair of cross-connected MOSFETs having their drains connected to each other's gate and to capacitive means;
   ii. a third MOSFET having its drain connected to the drain of one of said cross-connected MOSFETs and a fourth MOSFET having its drain connected to the drain of the other of said cross-connected MOSFETs;
   iii. a charging gate means connected between a source of first clock pulses and the sources of both said third and said fourth MOSFETs, and gated by said first clock pulses; and
   iv. means connected to the gates of said third and fourth MOSFETs for gating both during a first portion of said first clock pulse and only a selected one during at least a second portion of said first clock pulse;
   v. the sources of said cross-connected MOSFETs being connected to a source of second clock pulses;
e. said bit line means being connected to the drain of one of said cross-connected MOSFETs of the sense amplifier in the same row.

16. The device of claim 15 in which said capacitive means connected to the MOSFET drain to which said bit line means is connected is the bit line capacitance.

17. The device of claim 15, further comprising data input and data output means common to the entire array; and a plurality of Y address gate means, one for each row, said Y address gate means being selectively enabled during said address pulses and being connected between said data input and output means and said bit line means.

18. The device of claim 17, further comprising read gate means gated by clocked read pulses and connected between said data output means and said Y address gate means; and write gate means gated by clocked write pulses and connected between said data input means and said Y address gate means.

19. The device of claim 18, in which said read pulses occur during said second portion of said first clock pulses after said second clock pulse has ended.

20. The device of claim 18 in which said write pulses occur between said first clock pulses.

21. The device of claim 15, in which each said bit line means is divided into two separate halves, one half being connected to the drain of one of the cross-connected MOSFETs of its amplifier, and the other half being connected to the drain of the other cross-connected MOSFET of the same amplifier.

22. The device of claim 15, in which said capacitive means are the respective line capacitances of the two halves of the bit line means.

23. The device of claim 21, further comprising input and output means connected to the sources of both said third and said fourth MOSFETs.

24. The device of claim 23, in which said means connected to the gates of said third and fourth MOSFETs gates a selected one thereof by generating a pulse which is a component part of all X addresses of the cells associated with a selected bit line half.

Disclaimer 3,588,844.—*Alton O. Christensen*, Houston, Tex. SENSE AMPLIFIER FOR SINGLE DEVICE PER BIT MOSFET MEMORIES. Patent dated June 28, 1971. Disclaimer filed June 20, 1977, by the assignee, *Shell Oil Company*.

Hereby enters this disclaimer to claims 1–14 of said patent.

[*Official Gazette August 23, 1977.*]